United States Patent [19]

Suda et al.

[11] Patent Number: 4,964,703
[45] Date of Patent: Oct. 23, 1990

[54] IMAGE-FORMING LENS

[75] Inventors: Shigeyuki Suda, Machida; Jun Hattori, Atsugi, both of Japan

[73] Assignee: Canon Kabushiki Kaishi, Tokyo, Japan

[21] Appl. No.: 358,497

[22] Filed: May 30, 1989

Related U.S. Application Data

[63] Continuation of Ser. No. 129,368, Nov. 30, 1987, abandoned, which is a continuation of Ser. No. 927,869, Nov. 7, 1986, abandoned.

[30] Foreign Application Priority Data

Nov. 22, 1985 [JP] Japan ................. 60-263078

[51] Int. Cl.$^5$ ............................................. G02B 3/00
[52] U.S. Cl. ................................................. 350/413
[58] Field of Search ..................................... 350/413

[56] References Cited

U.S. PATENT DOCUMENTS

| | | | |
|---|---|---|---|
| 3,486,808 | 12/1969 | Hamblen . | |
| 3,626,194 | 12/1971 | Hirano | 250/216 |
| 3,729,253 | 4/1973 | Moore . | |
| 4,027,952 | 6/1977 | Hugues . | |
| 4,415,238 | 11/1983 | Braat | 350/432 |
| 4,449,792 | 5/1984 | Arai | 350/432 |
| 4,457,590 | 7/1984 | Moore | 350/413 |
| 4,557,566 | 12/1985 | Kikuchi | 350/413 |
| 4,571,034 | 2/1986 | Nakamura | 350/432 |
| 4,634,233 | 1/1987 | Usami | 350/413 |
| 4,643,535 | 2/1987 | Ichikawa et al. | 350/413 |
| 4,647,159 | 3/1987 | Baba | 350/413 |
| 4,657,352 | 4/1987 | Suda et al. | 350/432 |
| 4,674,843 | 6/1987 | Baba et al. | 350/413 |
| 4,696,552 | 9/1987 | Hattori et al. . | |
| 4,721,369 | 1/1988 | Hattori | 350/413 |

FOREIGN PATENT DOCUMENTS

| | | |
|---|---|---|
| 6354 | 1/1980 | Japan . |
| 181516 | 11/1982 | Japan . |
| 122512 | 7/1983 | Japan . |
| 205122 | 11/1983 | Japan . |
| 62815 | 4/1984 | Japan . |
| 140308 | 7/1985 | Japan . |
| 140309 | 7/1985 | Japan . |
| 159817 | 8/1985 | Japan . |
| 163015 | 8/1985 | Japan . |
| 172010 | 9/1985 | Japan . |

OTHER PUBLICATIONS

Yamamoto, et al., Selfoc Microlens with a Spherical Surface, vol. 1, No. 6, Applied Optics (Mar. 15, 1982).

Primary Examiner—Rodney B. Bovernick
Assistant Examiner—Rebecca D. Gass
Attorney, Agent, or Firm—Fitzpatrick, Cella Harper & Scinto

[57] ABSTRACT

An image-forming lens having a primary surface defined by a spherical surface and located on the side of an object when the lens is used to provide negative magnification, a secondary surface defined by a flat plane and located on the side of an image, the lens having therein a refractive index distribution exhibiting a substantially spherical symmetry with its center located in the vicinity of the highest point of the primary surface located most distantly from the secondary surface when measured perpendicularly from the secondary surface.

14 Claims, 3 Drawing Sheets

SPERICAL
ABERRATION
SINE CONDITION

SPERICAL
ABERRATION
SINE CONDITION

IMAGE-FORMING LENS

This application is a continuation of application Ser. No. 07/129,368 filed Nov. 30, 1987, now abandoned; which is a continuation of application Ser. No. 06/927,869 filed Nov. 7, 1986, now abandoned.

BACKGROUND OF THE INVENTION

1. Field of the Invention

This invention relates to an image-forming lens such as an objective or collimator lens which is used in a video disk, audio disk or optical memory apparatus, and more particularly to a distributed index image-forming lens for an optical memory which has a numerical aperture NA of not more than about 0.5 and the aberration of which in the vicinity of the optical axis is preferably corrected.

2. Description of the Prior Art

As heretofore known, the distributions of the refractive indexes of distributed index lenses are classified into three fundamental refractive index distributions: radial, axial and spherical types. The radial type is defined by a refractive index distribution which is aligned in the radial direction perpendicular to the optical axis; the axial type is defined by a refractive index distribution which is aligned in the direction of the optical axis; and the spherical type has a refractive index distribution which exhibits a spherical symmetry about a point. Many proposals for using these distributed index lenses as objective lenses for optical disks have been made, such as in Japanese Patent Laid-Open No. 122512/1983, No. 62815/1984, No. 140309/1985 and No. 172010/1985. All of these proposals relate to single lenses having refractive index distributions of the radial or axial type alone. On the other hand, an image-forming system of the spherical type is disclosed in Japanese Patent Laid-Open No. 181516/1982. This system, however, employs a specific arrangement in which a core having a spherical refractive index distribution is coated with a cladding of a uniform medium. Such an arrangement is not preferable since it is difficult to manufacture, and it cannot facilitate the correction of any aberration of the spherical lens so long as the lens has a spherical refractive index distribution and a numerical aperture NA of not more than about 0.5.

SUMMARY OF THE INVENTION

The present invention is designed to solve the above-described problems. It is therefore an object of the present invention to provide an image-forming lens that has a simple construction and a spherical refractive index distribution in which, when the numerical aperture is not more than 0.5, spherical aberration can be corrected while satisfying the sine condition.

To this end, the present invention provides an image-forming lens in the form of a plano-convex lens in which a surface $\gamma_1$ on the object side is a spherical surface and a surface $\gamma_2$ on the image side is a plane surface. The image-forming lens has a refractive index distribution $N(\rho)$ exhibiting a substantially spherical symmetry with its center located in the vicinity of the highest point of the object-side surface $\gamma_1$, and which satisfies the following conditions:

(1) $N(\rho) = N_0 + N_1\rho^2 + N_2\rho^4 + \ldots$
(2) $1.56 < N_0 \leq 1.63$
(3) $0.35 < d/f < 0.60$
(4) $-0.25 < N_1 f^2 < -0.20$ where $N_0, N_1, N_2 \ldots$ are refractive index distribution coefficients; f is the focal length of the lens; d is the axial thickness of the lens; and $\rho$ is the distance from the highest point of the object-side surface $\gamma_1$. The relationship is obtained if it is assumed that the highest point of the object-side surface $\gamma_1$ corresponds to the origin (0, 0, 0) of a three-dimensional coordinate system; and the optical axis, meridional direction, and sagittal direction correspond to the X, Y and Z axes, respectively. Furthermore, for purposes of this specification and the concluding claims, the term "highest point" shall mean that point on the spherical surface $\gamma_1$ which is most distant from the plane surface $\gamma_2$ when measured perpendicularly from the plane surface $\gamma_2$.

In an ordinary optical disk or optical card for a recording and/or reproducing system, the recording surface is covered and protected by a cover glass. When the image-forming lens in accordance with the present invention is designed to take into consideration the thickness t of this cover substrate, it is preferable in selecting the system specifications to set the relationship between the focal length f of the image-forming lens and the thickness t of the cover substrate so that the following inequality is satisfied:

$$0.03 < t/f < 0.50. \tag{5}$$

Other features of the present invention are shown in the following description with reference to preferred embodiments thereof.

DETAILED DESCRIPTION OF THE PREFERRED EMBODIMENTS

Figure 1:
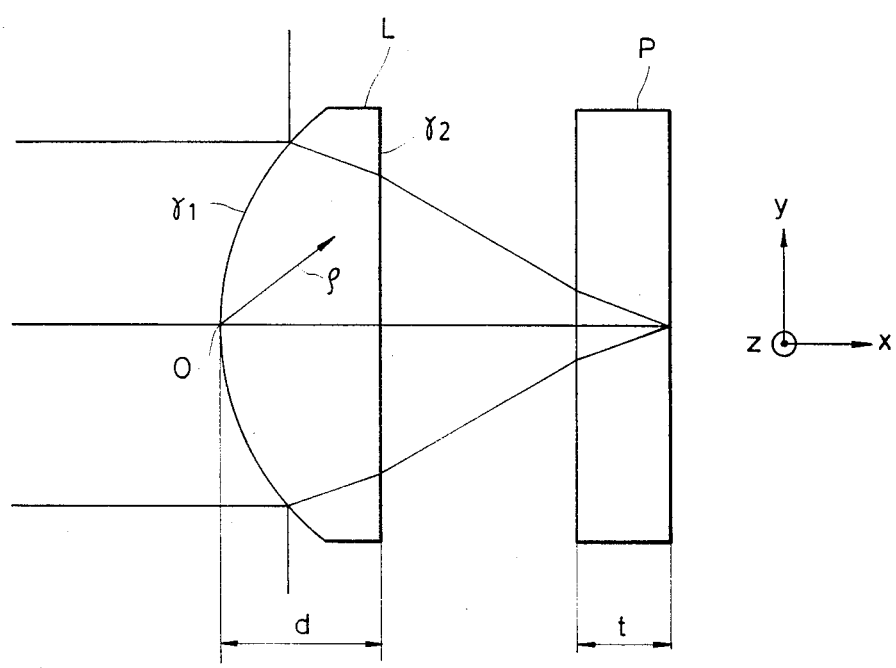
FIG. 1 is a cross-sectional view of an image-forming lens according to the present invention.

FIG. 1 is a cross-sectional view through an image-forming lens L in accordance with the present invention and a transparent cover substrate P, for example, of an optical disk or card. The image-forming lens L has a primary surface $\gamma_1$, a secondary surface $\gamma_2$, a thickness d at the axis of the lens L, and a highest point 0 on the primary surface $\gamma_1$. The cover substrate P has a thickness t. An arrow indicates the distance from the highest point 0. The curvature of the secondary surface $\gamma_2$ in accordance with the present invention is zero (radius of curvature: $\infty$), that is, the secondary surface $\gamma_2$ is a flat plane.

As described above, the present invention specifies that the primary surface $\gamma_1$ is provided on the object side and the secondary surface $\gamma_2$ is provided on the image side, when the lens is used to provide negative magnification. Accordingly, when the lens is used as an objective lens for recording on an optical memory such as an optical disk or card, the surface of the lens which faces the recording surface is the secondary surface, as shown in FIG. 1; and when the lens is used as a collimator lens for a semiconductor laser or the like, the surface of the lens which faces the light source is the secondary surface. As noted, the cover substrate P disposed on the image surface side may be, for example, a protective substrate of a recording medium for optical disks, or may be the beam-issuing aperture of a semiconductor laser.

In the optical path diagram shown in FIG. 1, an image is formed on one surface of the parallel-plane plate, namely, the cover substrate P, opposite to the other surface thereof facing the lens L. However, this parallel-plane plate may be disposed in the vicinity of the lens or be connected thereto, when the lens is used as a collimator lens.

Inequalities (2) to (5) for the lens in accordance with the invention are set forth below, and it is assumed that all of these inequalities are satisfied.

(2) $1.56 < N_0 \leq 1.63$ (3) $0.35 < d/f < 0.60$ (4) $-0.25 < N_1 f^2 < -0.20$ (5) $0.03 < t/f < 0.50$ Formula (1), set forth in the Summary of the Invention, represents a spherical refractive index distribution in general. Inequality (2) above indicates the condition of a refractive index $N_0$ at the center of the refractive index distribution in accordance with the present invention, namely the refractive index defined in the vicinity of the highest point of the primary surface $\gamma_1$. This inequality is determined by a condition which corrects the spherical aberration and the sine condition when the secondary surface $\gamma_2$ is assumed to be a flat plane. The sine condition is a condition of constant aberration in the vicinity of image points on the axis. To satisfy this condition, it is necessary to eliminate the coma in the vicinity of image points on the axis over the entire luminous flux. The offence of sine condition, which is described below, represents the amount of deviation from the sine condition, in other word, it is a quantity which represents the occurrence of the coma in the vicinity of image points on the axis. That is, if $N_0$ is smaller than the lower limit value in Inequality (2), the offence of sine condition (hereinafter referred to as the O.S.C.) is negative at the part thereof which is of a high order and therefore causes introverted coma. If $N_0$ is larger than the higher limit value, the O.S.C. is positive and hence causes extroverted coma. Inequality (3) indicates the condition of the thickness d on the axis of the lens and at the same time indicates a condition wherein the spherical aberration and the sine condition are corrected, along with a condition in which the edge thickness of the lens is adequately set. If d/f is smaller than the lower limit value in Inequality (3), a part of the O.S.C. is negative and the edge thickness of the lens is reduced, thus making it difficult to set NA at 0.45 to 0.5. If d/f is larger than the upper limit value, the O.S.C. is positive. Inequality (4) indicates the condition of a distribution coefficient $N_1$ which determines the basic distribution form of the refractive index distribution N ($\rho$). The spherical aberration and the O.S.C. are positive if $N_1 f^2$ is smaller than the lower limit in Inequality (4), and they are negative if $N_1 f^2$ is larger than the upper limit. Inequality (5) defines a condition relating to the thickness t of a parallel-plane plate such as the cover substrate P, and is determined by a thickness 1.0 to 1.5 mm for an ordinary optical disk plate, a focal length of 3 to 6 mm for an objective, a thickness of 0.5 to 1.5 mm for the emergence aperture portion of a semiconductor laser and a focal length of 8 to 16 mm for a collimator lens.

If, in Inequality (5), t/f is smaller than the lower limit, the thickness of the lens is so reduced in accordance with the conditions of the aberration correction that a proper value of NA cannot be obtained. Therefore it is impossible to use the lens as an objective. If t/f is larger than the upper limit, the thickness of the lens is increased too much for an adequate movable distance and a suitable interval between the light source and the lens to be set.

Thus, the invention can provide an image-forming lens with a simple construction including one flat surface, the NA of which is not more than 0.5 and the aberration of which is properly corrected, when the Inequalities (4) to (5) are satisfied.

The spherical refractive index distribution in accordance with the present invention can be provided in substantially the same manner as that in the case of microlenses, such that a spherical blank undergoes ion exchange or a blank in the form of a plane plate is covered by a mask having very fine holes and thereafter undergoes processing by a field-introducing method or the like, thus forming the refractive index distribution. It is also possible to employ a suspension polymerization method made public in the 32nd Applied Physics Associated Lecture Meeting (Oyo Busturigaku Kankei Rengo Koenkai), spring 1985.

The examples of the values defining the image-forming lens in accordance with the present invention will now be described below. The refractive index distribution formed in this image-forming lens can be represented by the above-mentioned formula (1) with, as a parameter, distance from the origin 0, which is assumed be the highest point 0 of the primary surface $\gamma_1$ of the lens. This representative formula has been determined for convenience sake, and it does not exclude other forms.

Tables 1 to 4 show lens data, refractive index distributions and items of other related data on the first to fourth examples of the image-forming lens provided in accordance with the present invention. In these tables, f represents the focal length; $\gamma_1$ and $\gamma_2$, the curvatures of the primary and secondary surfaces; NA, the numerical aperture; d, the axial thickness; $N_0$, the refractive index in the vicinity of the highest point of the primary surface; $N_1$, the refractive index distribution coefficient; t, the thickness of the cover substrate P; and $\eta t$, the refractive index of the substrate P. In each example, the refractive index distribution coefficients $N_2, N_3 \ldots$ are all set at zero.

TABLE 1

| f | NA | $\gamma_1$ | $\gamma_2$ | d | $N_0$ | $N_1$ | t | $\eta t$ |
|---|---|---|---|---|---|---|---|---|
| 4.5 | 0.5 | 3.2173 | $\infty$ | 1.93 | 1.5951 | $-1.09734 \times 10^{-2}$ | 1.2 | 1.4855 |

TABLE 2

| f | NA | $\gamma_1$ | $\gamma_2$ | d | $N_0$ | $N_1$ | t | $\eta t$ |
|---|---|---|---|---|---|---|---|---|
| 4.5 | 0.45 | 3.22133 | $\infty$ | 2.45084 | 1.57 | $-1.08943 \times 10^{-2}$ | 1.2 | 1.4855 |

TABLE 3

| f | NA | $\gamma_1$ | $\gamma_2$ | d | $N_0$ | $N_1$ | t | t |
|---|---|---|---|---|---|---|---|---|
| 4.5 | 0.5 | 3.23455 | $\infty$ | 1.90328 | 1.6 | $-1.9464 \times 10^{-2}$ | 1.2 | 1.4855 |

TABLE 4

| f | NA | $\gamma_1$ | $\gamma_2$ | d | $N_0$ | $N_1$ | t | t |
|---|---|---|---|---|---|---|---|---|
| 4.5 | 0.5 | 3.23646 | $\infty$ | 1.72694 | 1.61 | $-1.09514 \times 10^{-2}$ | 1.2 | 1.4855 |

FIGS. 2 to 5 show the aberration diagrams of the image-forming lenses of the first to fourth examples. In these drawings, S.A. represents the spherical aberration and O.S.C. represents the offence of sine condition. As shown in each aberration diagram, both the spherical aberration and the sine condition are properly corrected so as to ensure appropriate image-forming performance for this kind of lens system.

These examples are designed to satisfy the above condition formula (1) and condition inequalities (2) to (4) while being compatible with the relationship defined by the condition inequality (5). Other various image-forming lenses can be provided by formulating designs in consideration of the specification and the purpose of the devices in question using such lenses so as to satisfy the above-described conditions (1) to (4). Since the present invention specifically provides a lens in the plano-convex form, the lens is readily manufactured and, when the refractive index distribution is formed by the above-mentioned techniques, it becomes suitable for mass production.

As described above, the present invention provides the lens in the form of a plano-convex lens with a spherical refractive index distribution which can be readily manufactured with a simple construction, ensuring that any aberration in the vicinity of the axis of the lens can be properly corrected as long as the NA of the lens is not more than 0.5. The lens in accordance with the present invention is highly effective when used as an objective lens for an optical memory device and as a collimator lens for a semiconductor laser.

What is claimed is:

1. A refractive index distribution lens comprising:
   a first surface defined by a convex-spherical surface with a vertex, said first surface lying on the object side when said lens is used to provide negative magnification;
   a second surface defined by a flat surface, said second surface lying on the image side when said lens is used to provide negative magnification; and
   a refractive index distribution formed in the interior of said lens, said refractive index distribution having a sphere-symmetrical distribution about a point in the vicinity of the vertex of said first surface.

2. An image-forming lens according to claim 1, wherein, when said refractive index distribution is designated by N ($\rho$); the distance from said point is designated by $\rho$; and the focal length and the thickness of said lens designated by f and d, respectively, the following formulae are satisfied:

$$N(\rho) = N_0 + N_1\rho^2 + N_2\rho^4 + \ldots$$
$$1.56 < N_0 < 1.63$$
$$0.35 < d/f < 0.60$$
$$-0.25 < N_1 f^2 < -0.20$$

where $N_0, N_1, N_2 \ldots$ are refractive index distribution coefficients $N_0$ being a refractive index in the vicinity of said point.

3. A refractive index distribution lens comprising:
   a first surface defined by a convex-spherical surface with a vertex;
   a second surface defined by a flat surface; and
   a refractive index distribution formed in the interior of said lens, said refractive index distribution having a sphere-symmetrical about a point in the vicinity of the vertex of said first surface, wherein said first surface is disposed on the light source side when said lens is used as an objective lens, and said second surface is disposed on the light source side when said lens is used as a collimator lens.

4. A refractive index distribution lens according to claim 3, wherein said refractive index distribution $N(\rho)$, the distance $\rho$ from said point, and the refractive index $N_0$ of the portion of said lens in the vicinity of said point meet the following conditions:

$$N(\rho) = N_0 + N_1\rho^2 + N_2\rho^4 + \ldots$$
($N_1, N_2$ being refractive index distribution coefficients)

and $$1.56 < N_0 < 1.63.$$

5. A refractive index distribution lens according to claim 4, wherein the focal distance f of said lens and the thickness d of said lens as measured on the optical axis meet the following conditions:

$$0.35 < d/f < 0.60$$

6. A refractive index distribution lens according to claim 5, wherein the following condition is further met:

$$-0.25 < N_1 f^2 < -0.20$$

7. A refractive index distribution lens according to claim 3, wherein the focal distance f of said lens and the thickness d of said lens as measured on the optical axis meet the following condition:

$$0.35 < d/f < 0.60$$

8. A refractive index distribution lens according to claim 3, wherein said refractive index distribution $N(\rho)$; the distance $\rho$ from said point, the refractive index $N_0$ of the portion of said lens in the vicinity of said point and the focal distance f of said lens meet the following conditions:

$$N(\rho) = N_0 + N_1\rho^2 + N_2\rho^4 + \ldots$$
($N_1$, $N_2$ being refractive index distribution coefficients)

and $$0.25 < N_1 f^2 < -0.20.$$

9. A refractive index distribution lens according to claim 8, wherein the following condition is further met:

$$1.56 < N_0 \leq 1.63$$

10. A refractive index distribution lens according to claim 8, wherein the following condition is further met:

$$0.35 < d/f < 0.60$$

where d represents the thickness of said lens as measured on the optical axis of said lens.

11. A refractive index distribution lens for focusing a laser beam on a recording surface through a transparent layer formed thereon, comprising:
a first surface defined by a convex-spherical surface with a vertex;
a second surface defined by a flat surface, said second surface lying on the side of said recording surface; and
a refractive index distribution formed in the interior of said lens, said refractive index distribution having a sphere-symmetrical distribution about a point in the vicinity of the vertex of said first surface, wherein when said refractive index distribution is designated by $N(\rho)$; the distance from said point designated by $\rho$; and the focal length and the thickness of said lens designated by f and d, respectively, the following formulae are satisfied:

$$N(\rho) = N_0 + N_1\rho^2 + N_2\rho^4 + \ldots$$
$$1.56 < N_0 < 1.63$$
$$0.35 < d/f < 0.60$$
$$-0.25 < N_1 f^2 < -0.20$$

where $N_0$ $N_1$ $N_2$ ... are refractive index distribution coefficients, $N_0$ being a refractive index in the vicinity of said point.

12. A refractive index distribution lens according to claim 11, wherein the following inequality is also satisfied:

$$0.03 < t/f < 0.50$$

where t is the thickness of said transparent layer.

13. A refractive index distribution lens for collimating a laser beam from a semiconductor laser having a cover glass, comprising:
a first surface defined by a convex-spherical surface with a vertex;
a second surface defined by a flat surface, said second surface lying on the side of said semiconductor laser; and
a refractive index distribution formed in the interior of said lens, said refractive index distribution having a sphere-symmetrical distribution about a point in the vicinity of the vertex of said first surface, wherein when said refractive index distribution is designated by $N(\rho)$; the distance from said point designated by $\rho$; and the focal length and the thickness of said lens designated by f and d, respectively, the following formulae are satisfied:

$$N(\rho) = N_0 + N_1\rho^2 + N_2\rho^4 + \ldots$$
$$1.56 < N_0 < 1.63$$
$$0.35 < d/f < 0.60$$
$$-0.25 < N_1 f^2 < -0.20$$

where $N_0$, $N_1$, $N_2$ ... are refractive index distribution coefficients, $N_0$ being a refractive index in the vicinity of said point.

14. A refractive index distribution lens according to claim 13, wherein the following inequality is also satisfied:

$$0.03 < t/f < 0.50$$

where t is the thickness of said cover glass.

* * * * *

UNITED STATES PATENT AND TRADEMARK OFFICE
CERTIFICATE OF CORRECTION

PATENT NO. : 4,964,703

DATED : October 23, 1990

INVENTOR(S) : SHIGEYUKI SUDA, ET AL.

It is certified that error appears in the above-identified patent and that said Letters Patent is hereby corrected as shown below:

Column 2:
    Line 13, "ship" should read --ship $\rho=\sqrt{X^2+Y^2+Z^2}$--.

Column 3:
    Line 49, "word," should read --words,--.

Column 5:
    Line T3, "t  t" should read --t  $\eta$t--.
    Line T4, "t  t" should read --t  $\eta$t--.

Column 6:
    Line 24, "An image-forming lens" should read --a refractive index distribution lens--.

Line 38, "coefficients $N_0$" should read --coefficients, $N_0$--.

Line 46, "sphere-symmetrical about" should read --sphere-symmetrical distribution about--.

Line 68, "conditions:" should read --condition:--.

Column 7:
    Line 29, "$0.25<N_1 f^2<-0.20.$" should read -- $-0.25<N_1 f^2<-0.20$ --

UNITED STATES PATENT AND TRADEMARK OFFICE
CERTIFICATE OF CORRECTION

PATENT NO. : 4,964,703
DATED : October 23, 1990
INVENTOR(S) : SHIGEYUKI SUDA ET AL.

It is certified that error appears in the above-identified patent and that said Letters Patent is hereby corrected as shown below:

Item [56] RC:

Line AAF, "Fitzpatrick, Cella Harper & Scinto" should read --Fitzpatrick, Cella, Harper & Scinto--.

Figure 2:
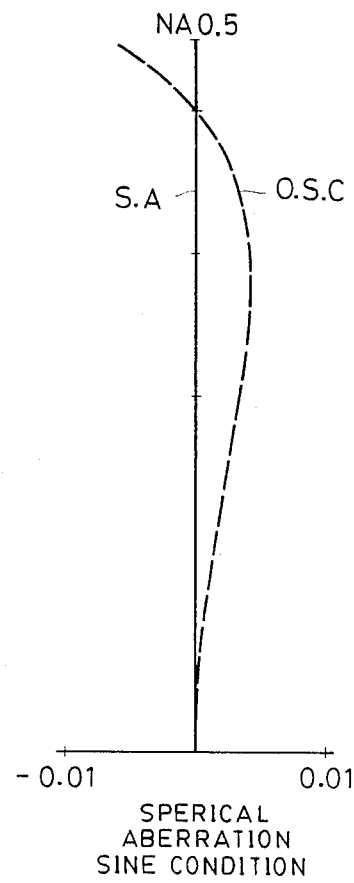
FIGS. 2 to 5 are graphs of the aberrations of image-forming lenses which are first to fourth examples of the design of the invention.
Figure 3:
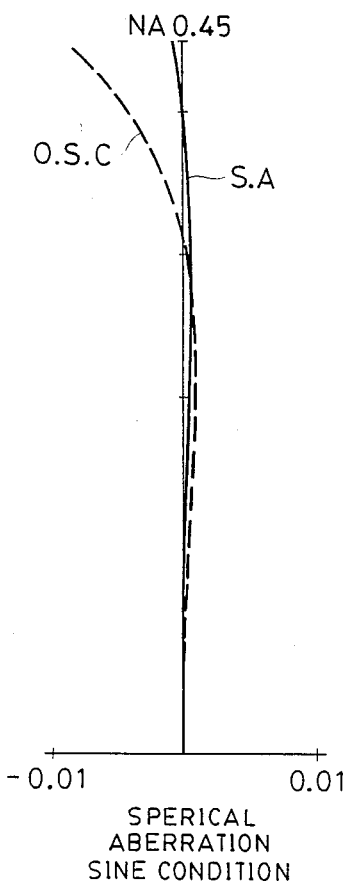

Sheet S2:    2 of 3 Drawings
    Fig. 2,   "SPERICAL" should read --SPHERICAL--.
    Fig. 3,   "SPERICAL" should read --SPHERICAL--.

Figure 4:
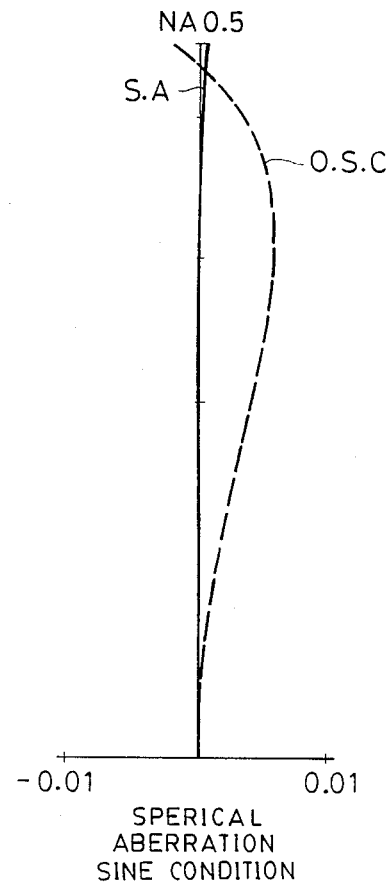
Figure 5:
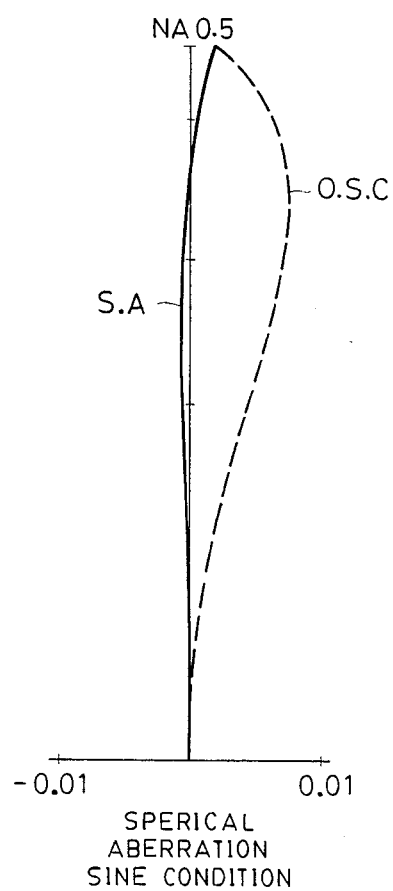

Sheet S3:    3 of 3 Drawings
    Fig. 4,   "SPERICAL" should read --SPHERICAL--.
    Fig. 5,   "SPERICAL" should read --SPHERICAL--.

Signed and Sealed this

Eighteenth Day of August, 1992

Attest:

DOUGLAS B. COMER

*Attesting Officer*        *Acting Commissioner of Patents and Trademarks*